(12) United States Patent
Huang

(10) Patent No.: US 6,892,630 B1
(45) Date of Patent: May 17, 2005

(54) DEVICE FOR MOLDING SPHEROIDAL FOOD PRODUCTS

(76) Inventor: Lien-Fu Huang, P.O. Box No. 6-57, Junghe, Taipei 235 (TW)

( * ) Notice: Subject to any disclaimer, the term of this patent is extended or adjusted under 35 U.S.C. 154(b) by 35 days.

(21) Appl. No.: 10/761,301

(22) Filed: Jan. 22, 2004

(51) Int. Cl.⁷ .......................... A23L 1/00; A21C 11/10; A23P 1/00
(52) U.S. Cl. .................. 99/450.1; 99/353; 99/450.6; 99/450.7; 425/308
(58) Field of Search ............. 99/353–355, 450.1–450.8, 99/537, 538; 425/132, 142, 308–311, 287, 315, 466, 316; 426/496, 503, 512, 518, 283

(56) References Cited

U.S. PATENT DOCUMENTS

| | | | | |
|---|---|---|---|---|
| 4,024,945 A | * | 5/1977 | Mugishima | 198/418.6 |
| 4,767,305 A | * | 8/1988 | Tashiro | 425/308 |
| 4,882,185 A | * | 11/1989 | Simelunas et al. | 426/283 |
| 4,936,203 A | * | 6/1990 | Aoki et al. | 99/450.1 |
| 5,031,520 A | * | 7/1991 | Tsay | 99/353 |
| 5,098,273 A | * | 3/1992 | Tashiro | 425/132 |
| 5,100,682 A | * | 3/1992 | Matthews et al. | 426/282 |
| 5,153,010 A | * | 10/1992 | Tashiro et al. | 425/287 |
| 5,190,770 A | * | 3/1993 | Tashiro | 425/132 |
| 5,223,277 A | * | 6/1993 | Watanabe et al. | 425/132 |
| 5,518,391 A | * | 5/1996 | Tashiro | 425/308 |
| 5,820,890 A | * | 10/1998 | Kobayashi | 425/133.1 |
| 5,916,601 A | * | 6/1999 | Onoguchi et al. | 425/132 |

* cited by examiner

Primary Examiner—Timothy F. Simone
(74) Attorney, Agent, or Firm—Troxell Law Office PLLC

(57) ABSTRACT

A device for molding spheroidal food products including a set of cutting tool elements, and a central opening which is formed from frontal sections of blades defined on front-ends of the set of cutting tool elements. Convex rails and a slide grooves are formed on an inner and an outer sliding surface of each of the cutting tool elements respectively. During course of the blades of the cutting tool elements converging, the convex rails and the slide grooves knead a circumferential surface of a cylindrical food product passing through the central opening, thereby forming a plurality of position-fixing depressions, and the depressions gradually deepen around a central region of the cylindrical food product as the blades converge. Upon the central opening being closed by converging of the blades, thus the blades making mutually contact sever the cylindrical food product and forms the spheroidal food product therefrom.

7 Claims, 18 Drawing Sheets

DEVICE FOR MOLDING SPHEROIDAL FOOD PRODUCTS

BACKGROUND OF THE INVENTION (a) Field of the Invention

The present invention relates to a device for molding spheroidal food products, and more particularly to a device for severing cylindrical food products and forming spheroidal food products therefrom.

(b) Description of the Prior Art

According to conventional equipment providing functionality to sever cylindrical food products and form spheroidal bodies therefrom, exemplifications that typify prior art include a Taiwan patent Publication No. 163112, wherein a sliding surface of a cutting member (namely a blade) is adapted to form a single convex surface, and another sliding surface forms a single concave surface, wherewith by means of sliding contact of the convex and concave surfaces of the adjacent cutting members opening or closing of a central opening by a plurality of the cutting members is realized, and thus achieves severing of the cylindrical food products into spheroidal food bodies when the cylindrical food products pass through the central opening.

However, after long-term usage of the plurality of cutting members, mutual sliding contact therebetween results in the following defects:

1. Frictional wear easily results from long-term sliding friction between the single concave surface and the adjacent single convex surface of any of the cutting members, causing a gap to be formed between the adjacent cutting members, poor transmission of moment of force, and inability to produce close-matching mutual sliding. Thus, upon a gap being formed between the adjacent sliding surfaces, closing or opening of the cutting members will particularly result in incomplete closing of the central opening or inability of the central opening to completely open, and therefore brings about inability of blades of the cutting members to completely sever the cylindrical dough food product, and remnants of filling or dough remain on a surface of the molded spheroidal food products. The spheroidal food products thus produced are regarded as poor quality with respect to quality control of outward appearance. Hence, when the central opening is unable to be opened to pre-calibrated width, concern arises that comparatively bulkier cylindrical food products will be unable to accurately pass through the central opening.

2. No lubricating device between the plurality of cutting members, and thus mutual sliding of the sliding surfaces easily results in frictional wear.

SUMMARY OF THE INVENTION

A primary objective of the present invention is to provide a device for molding spheroidal food products, and therewith actualize steady and unhindered sliding displacement of sliding surfaces between each pair of adjacent cutting tools, thereby effectively preventing a gap from being formed between the sliding surfaces of the adjacent cutting tools, enhancing long-term reliability of opening and closing of a central opening by corresponding opening and closing motion of a cutting tools set, and thus achieve accurate and effective severing of a cylindrical food product to form spheroid items therefrom.

Another objective of the present invention is to provide a device for molding spheroidal food products, whereby when severing the cylindrical food product, the cylindrical food product is held by a comparatively superior grasping and positioning moment of force, thereby achieving effective severing of the cylindrical food products made from constituents of comparatively high resilient texture to form spheroidal food products therefrom.

Yet another objective of the present invention is to provide a device for molding spheroidal food products, and actualize provision for a lubricant between the sliding surfaces of each pair of the adjacent cutting tools, thereby achieving effectiveness of lubricating the device, and thus effectively preventing rise in temperature and frictional wear of the sliding surfaces thereof.

To enable a further understanding of the said objectives and the technological device of the invention herein, the brief description of the drawings below is followed by the detailed description of the preferred embodiments.

DETAILED DESCRIPTION OF THE PREFERRED EMBODIMENTS

Figure 1:
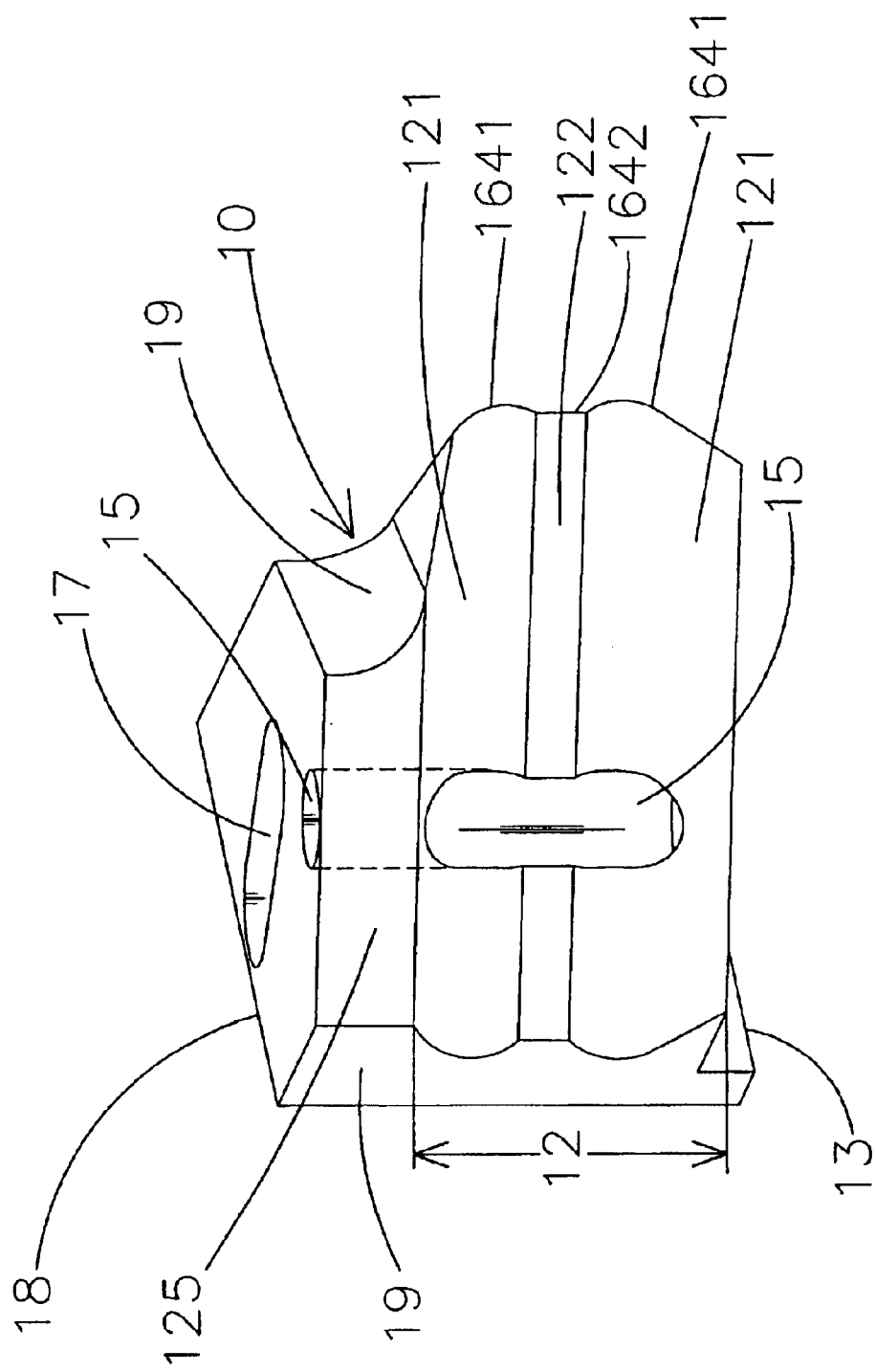
FIG. 1 shows an elevational view of a cutting tool element according to the present invention.

Referring to FIGS. 1, 2, 3, 4 and 5, which show the present invention providing a device for molding spheroidal food products comprising:

a plurality of cutting tool elements 10; a central opening 101 formed from frontal sections of blades 164 defined on front-ends of the plurality of cutting tool elements 10, a cylindrical food product 90 continuously passes downwardly through the central opening 101 (see FIG. 8), and the blade 164 of any of the cutting tool elements 10 actively contributes to advancing or retreating displacement of the central opening 101 toward direction of a central line P, thereby enabling the plurality of blades 164 to realize opening or closing of the central opening 101.

Figure 2:
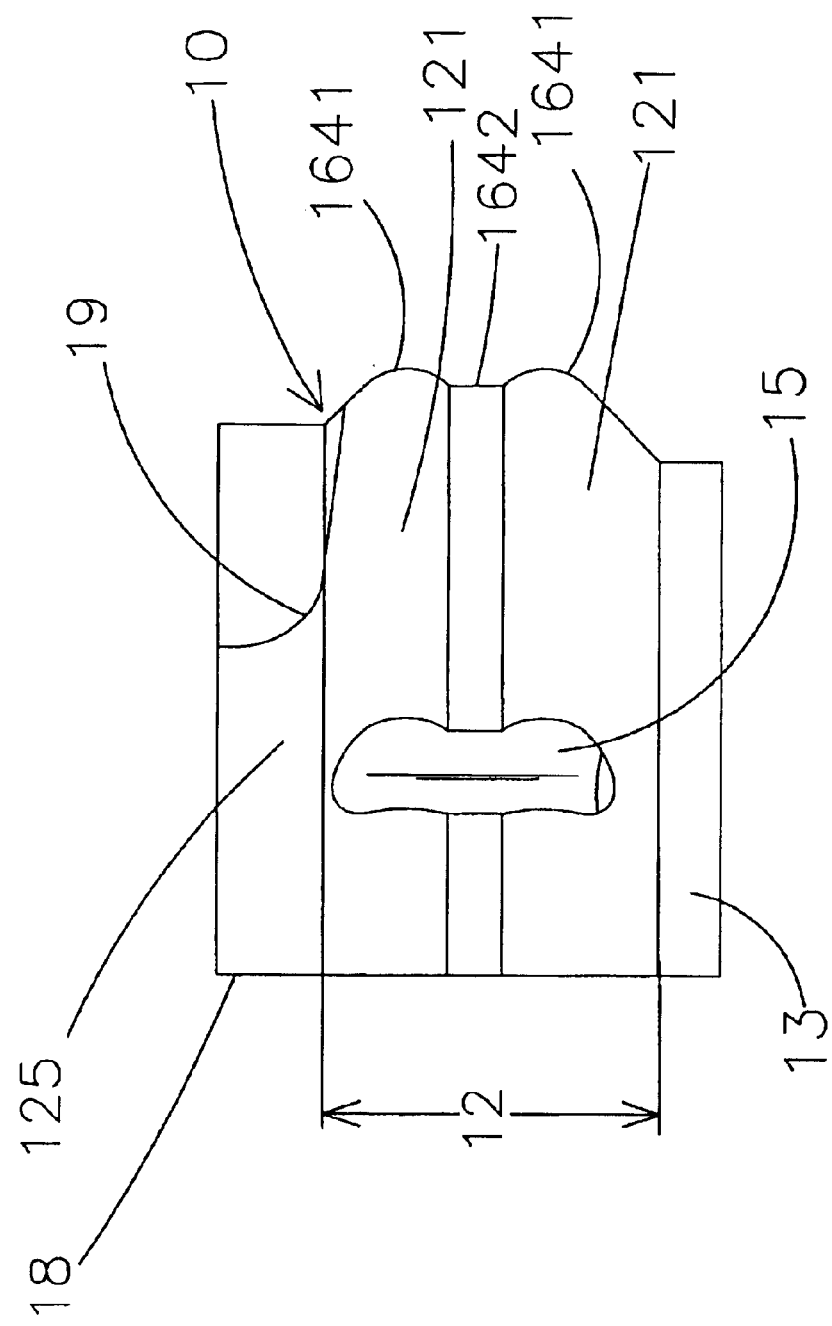
FIG. 2 shows a front view of the cutting tool element according to the present invention.
Figure 3:
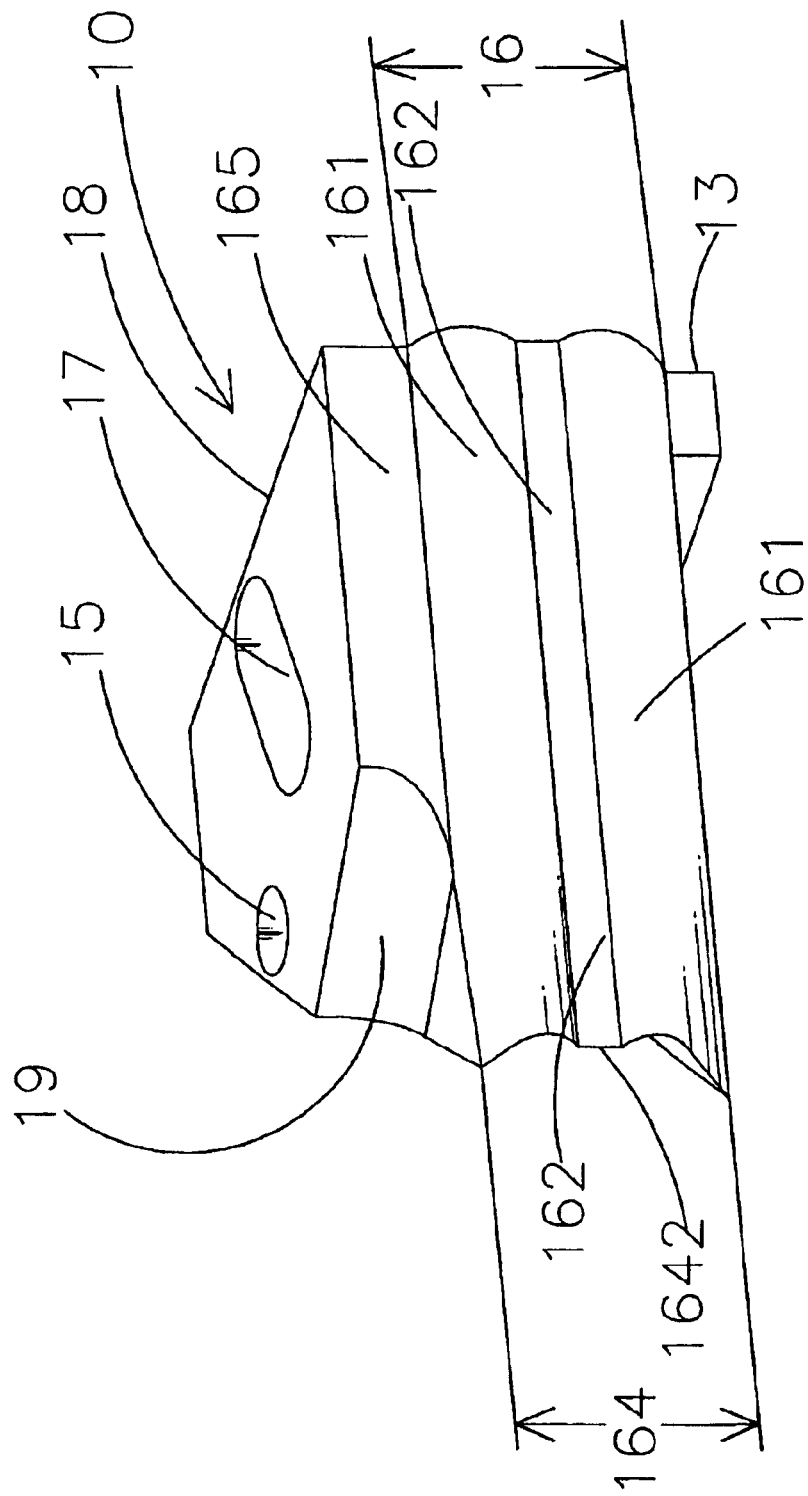
FIG. 3 shows a side elevational view of the cutting tool element according to the present invention.

Referring to FIGS. 1, 2 and 3, which show an inner side sliding surface 12 and an outer side sliding surface 16 configured on each of the cutting tool elements 10. Wherein a transverse slide groove 121 and a convex rail 122 are respectively configured on the inner side sliding surface 12, and a transverse slide groove 162 and a convex rail 161 are respectively configured on the outer side sliding surface 16 (see FIG. 3). The convex rails 161 and 122 of each of the adjacent cutting tool elements 10 slide along the slide grooves 121 and 162 respectively, thereby shifting position (see FIGS. 4 and 5). An edge formed from angle of intersection of the inner side sliding surface 12 and the outer side sliding surface 16 defines the blade 164 of each of the cutting tool elements 10. During course of closing displacement of the plurality of blades 164, and therefrom closing of the central opening 101, the plurality of convex rails 161 and 122 exert pressure and hold firm a circumferential surface of the cylindrical food product 90, thereby enabling the surface of the cylindrical food product 90 to gradually form a plurality of deep depressions 93 and protrusions 94 along a central region of the cylindrical food product 90 (see FIG. 10). Upon the plurality of blades 164 mutually converging on the central line P, the central opening 101 correspondingly closes. The cylindrical food product 90 is thereupon severed by the converged plurality of blades 164, and molded into a spheroidal food product 95 (see FIGS. 9, 10 and 11).

Figure 4:
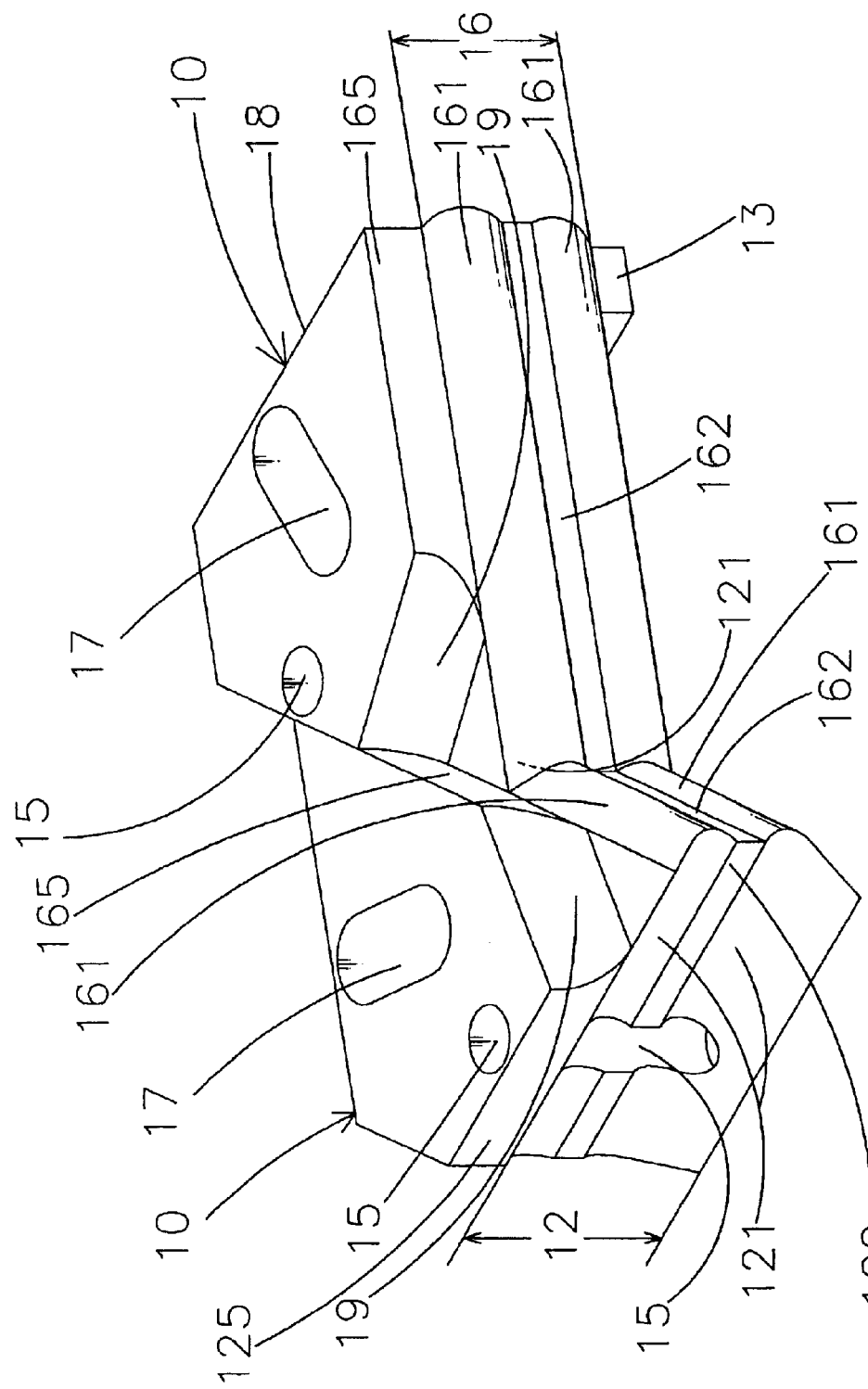
FIG. 4 shows an elevational view of sliding surfaces of any pair of the adjacent cutting tool elements making sliding contact according to the present invention.
Figure 5:
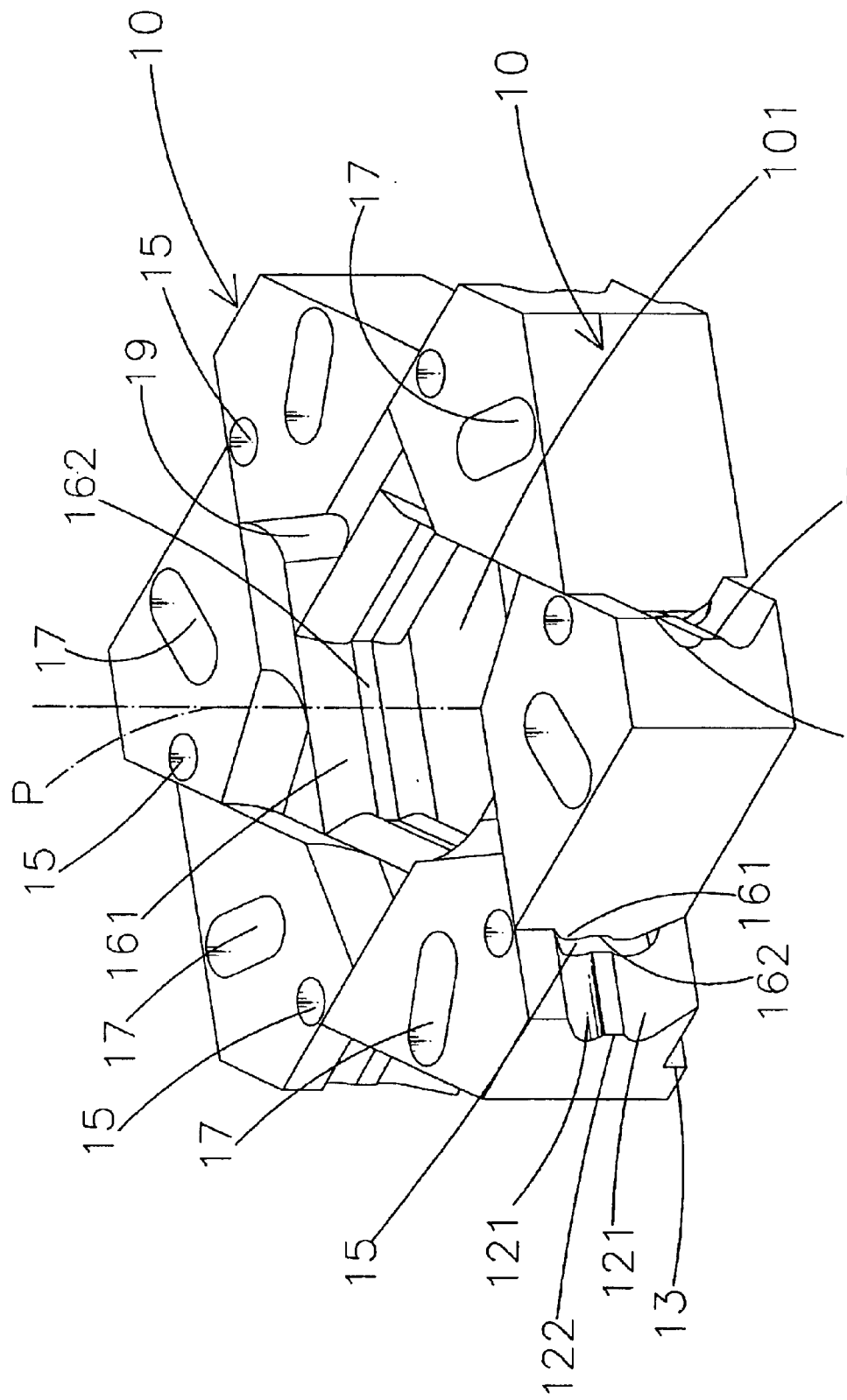
FIG. 5 shows an elevational view of a plurality of the cutting tool elements making sliding contact and forming a central opening according to the present invention.

Referring to FIGS. 4 and 5, which show the present invention providing a device for molding spheroidal food products, and comprising:

the plurality of cutting tool elements 10;

the central opening 101 formed from the frontal sections of the blades 164 defined on the front-ends of the plurality of cutting tool elements 10;

Referring to FIGS. 1, 2 and 3, wherein each of the cutting tool elements 10 are configured with:

the inner side sliding surface 12, whereon the plurality of transverse grooves 121 are defined, and the convex rail 122 is formed between each pair of the adjacent grooves 121;

the outer side sliding surface 16, whereon is configured a plurality of transverse convex rails 161, and the groove 162 is defined from an indentation formed between each pair of the adjacent convex rails 161;

the blade 164, whereby the edge formed from the angle of intersection of the inner side sliding surface 12 and the outer side sliding surface 16 defines the blade 164. Referring to FIG. 4, which shows the plurality of arc-shaped rails 161, which operate in coordination with and slide within the slide grooves 121 of the adjacent cutting tool elements 10, and the slide grooves 162 which operate in coordination with and slide on the convex rails 122 of the adjacent cutting tool elements 10.

According to the aforementioned device for molding spheroidal food products, wherein an upper vertical convex surface 125 is configured on an upper edge of a surface of the inner side sliding surface 12, and an upper vertical concave surface 165 is configured on the outer side sliding surface 16, whereby the vertical concave surface 165 can slide on the convex surface 125.

Figure 6:
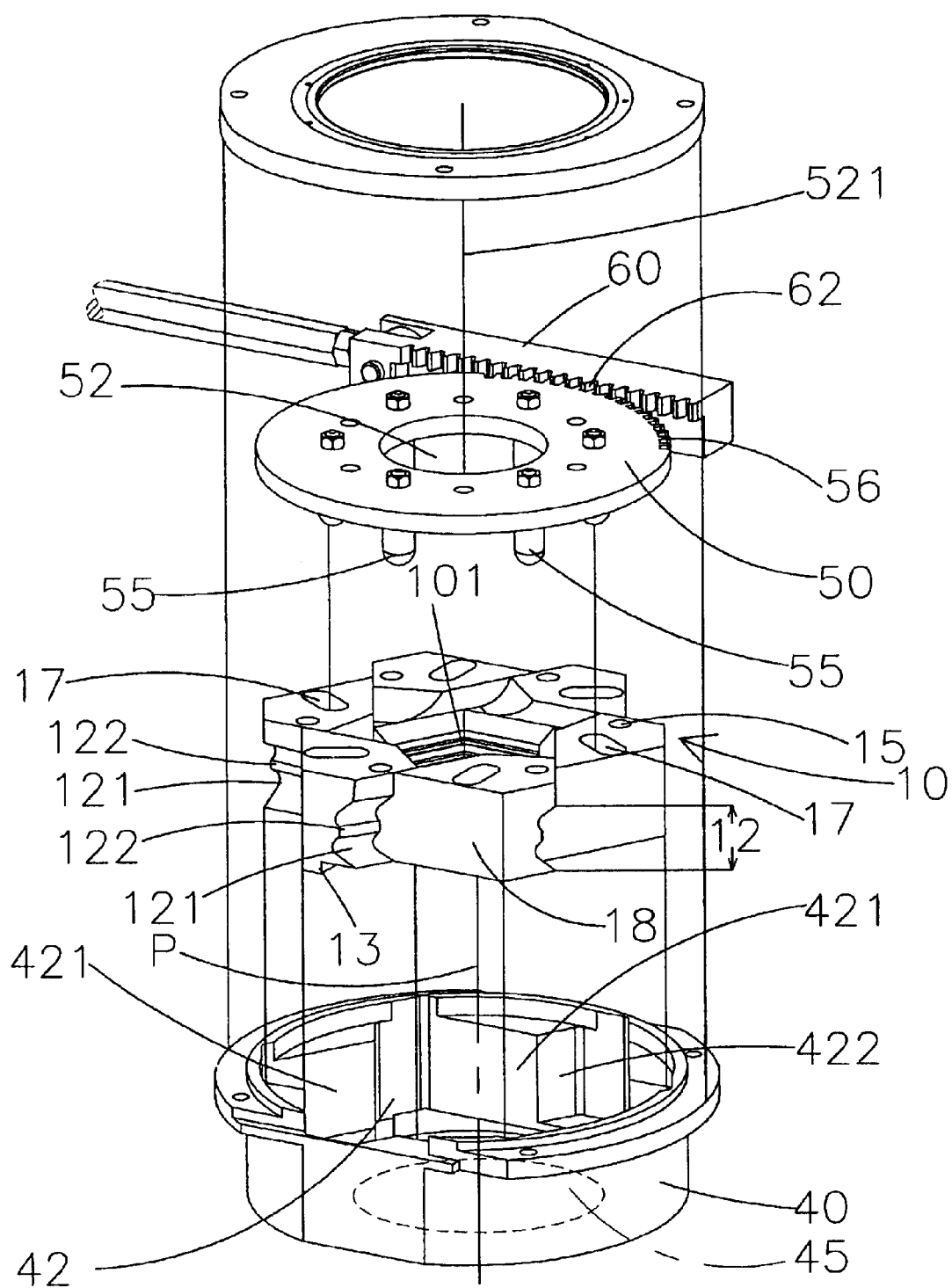
FIG. 6 shows an exploded elevational view of an assemblage of the plurality of cutting tool elements, a disc and a transmission unit according to the present invention.

Referring to FIGS. 4 and 6, a rear side wall surface of each of the cutting tool elements 10 forms a first sliding surface 18, and a second sliding surface and a top wall surface 422 are respectively configured on an inner circumferential edge wall of a recess 42 interior to a disc 40. The first sliding surface 18 slides on the second sliding surface 421. The inner side sliding surface 12 slides and berths on the top wall surface 422. A central perforation 45 is defined in the recess 42, which provides for a mutual passage with the central opening 101.

According to the primary device as aforementioned, wherein the plurality of cutting tool elements 10 are pin connected to an annular plate 50. A circular perforation 52 is defined in the annular plate 50, and a plurality of guide pins 55 are respectively firmly secured on an underneath face of the annular plate 50. Each of the guide pins 55 freely connect and respectively slide within a groove 17 defined atop each of the cutting tool elements 10. A system of teeth 56 are configured on an outer edge of the annular plate 50, whereby the teeth 56 mesh with teeth 62 of a row of teeth 60. The row of teeth 60 are so configured to run back and forth, thereby driving the plate 50 to correspondingly rotate to-and-fro in a clockwise and anticlockwise direction. The guide pins 55 drive the plurality of cutting tool elements 10 to mutually slide displace, and as a consequence open and close the central opening 101 therefrom. According to the device for molding spheroidal food products as aforementioned, wherein vertical grooves 15 are defined in the inner side sliding surfaces 12, and provide for semisolid edible oil to be infixed for additory usage therewith (see FIGS. 4 and 8).

According to characteristics of the device as aforementioned, wherein a continuity assembly of at least one convex blade 1641 and at least one vertical blade 1642 is configured on the blade 164 of each of the cutting tool elements 10. The convex blades 1641 of each pair of corresponding cutting tool elements 10 can mutually contact and converge, and the vertical blades 1642 of each pair of corresponding cutting tool elements 10 can also mutually contact and converge, thereby enabling closing of the central opening 101.

According to the device for molding spheroidal food products as aforementioned, referring to FIGS. 14, 15, 16, 17 and 18, wherein an abutting device 80 is configured directly below the central opening 101, and comprises:

a top plate 81 positioned below the central perforation 45, a lower end of the top plate 81 is connected to a slide plate 82, and a lower end of the slide plate 82 is provided with a connecting terminal 821;

a rocker set 85 driven by a cam 89, the rocker set comprising an upper connecting rod 851, one end of which is loose connected to a fixed shaft 83, with the fixed shaft 83 serving as axle center of gyration, and another end is loose connected to one end of a vertical connecting rod 852, and wherein a small pulley 853 is configured at an appropriate position on a side rod of the upper connecting rod 851. One end of a spring 84 is attached to a stationary member 100, thereby forming a fixed terminal. Another end is connected to the upper connecting rod 851, thus the upper connecting rod 851 is provided with a springiness effect. One end of a lower connecting rod 854 is loose connected to a lower end of the vertical connecting rod 852, and another end is loose connected to the connecting terminal 821 of the slide panel 82;

the small pulley 853, which is driven by intermittent contact of protruding ends 891 of the cam 89, thereby impelling the slide plate 82 to translate position in an upward or downward direction.

A conveyor belt 300 is positioned atop the top plate 81, whereby upward translation of the top plate 81 displaces upward and supports the conveyor belt 300 at a higher position, and downward translation of the top plate 81 to a bottom dead center thereat releases the conveyor belt 300.

Methods of Implementation:

1. Mutual Stable Sliding Motion of Each Adjacent Cutting Tool Element 10:

Referring to FIG. 4, which shows a pair of the adjacent cutting tool elements 10, wherein a plurality of the convex rails 161 of one of the cutting tool elements 10 and a plurality of the slide grooves 121 of another cutting tool element 10 reciprocally make sliding contact, while the slide grooves 162 and the adjacent rails 122 reciprocally make sliding contact.

Motion of reciprocal contributing effort and sliding of the plurality of cutting tool elements 10 is considerably stable (see FIG. 5), wherewith when the plurality of cutting tool elements 10 are in sliding motion, long-term sliding motility in a planar direction is maintained, as well as effectively preventing any angular prizing from occurring in the sliding motility of the adjacent cutting tool elements 10. Hence, when the plurality of blades 164 interfacially converges, degree of accuracy of compactness is enhanced, and thus effectively severs the cylindrical food product 90 to form spheroidal food products 95 therefrom (see FIGS. 10 and 11).

Figure 10:
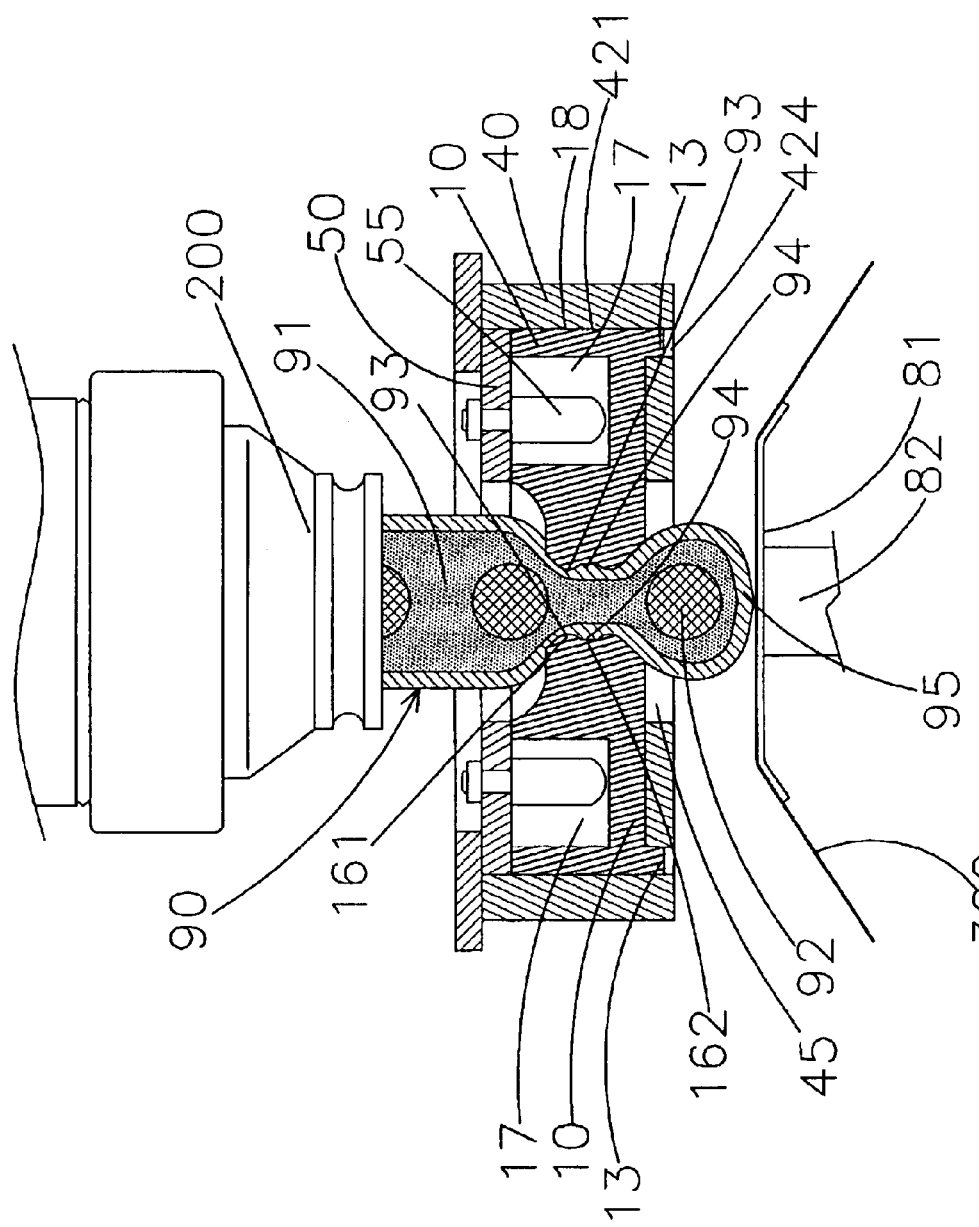
FIG. 10 shows a cross sectional view of a cutting tool set elements during process of severing a cylindrical food product according to the present invention.

Referring to FIG. 10, a protrusion 13 is configured on a lower edge of each of the cutting tool elements 10, and provides for slide connecting into a groove 424 defined in a lower section of the B sliding surface 421. The groove 424 is of a long strip-like form, and when the cutting tool elements 10 are being displaced, the protrusions 13 thereupon slide and position of same are displaced within the grooves 424, thus increasing steadiness of the translatory directions of the cutting tool elements 10.

Referring to FIG. 4, the convex surfaces 125 of the adjacent cutting tool elements 10 reciprocally slide within the concave surfaces 165 thereof, and there because further enhances steady sliding of the adjacent cutting tool elements 10.

Figure 7:
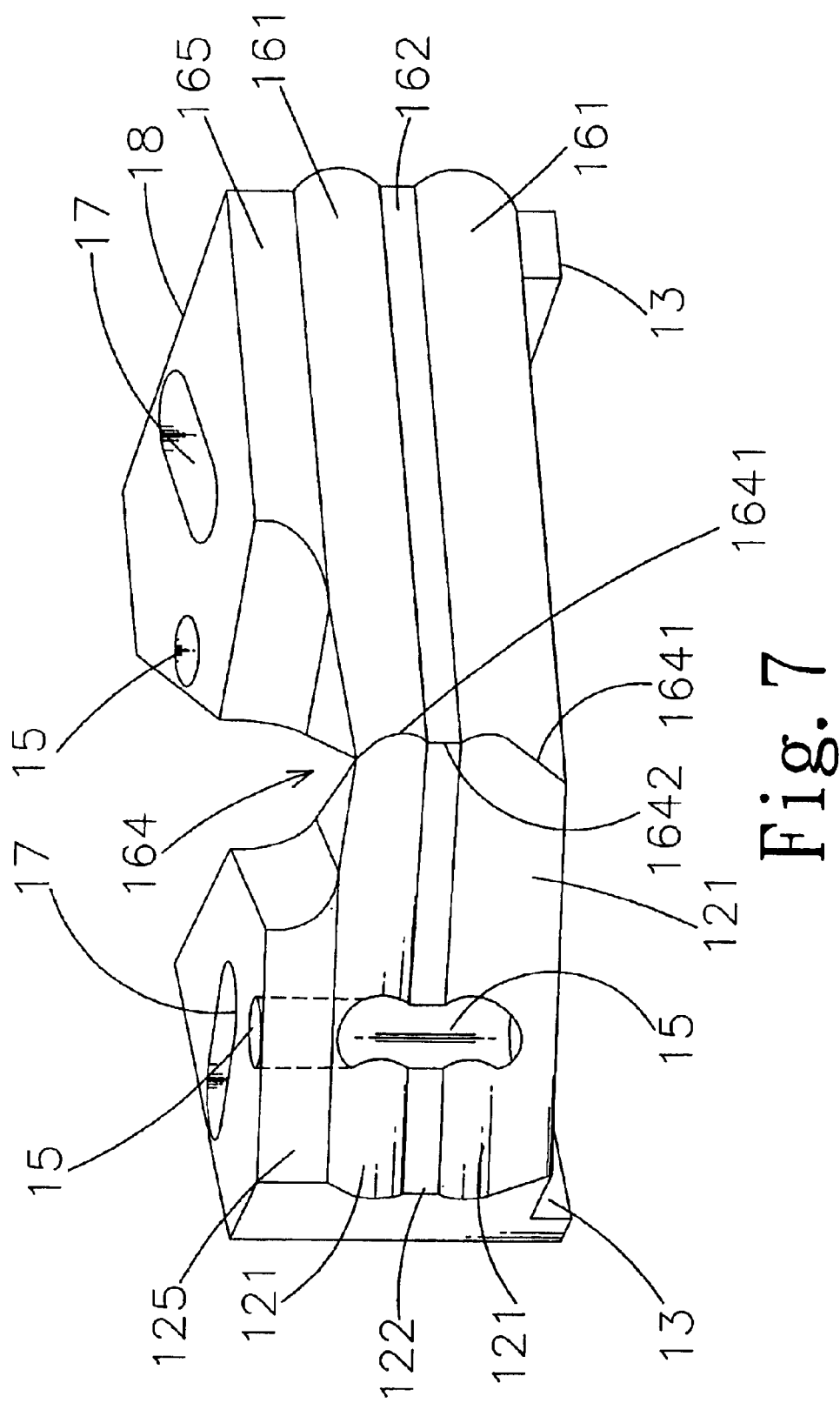
FIG. 7 shows an elevational view of corresponding contact of blades of two of the cutting tool elements according to the present invention.
Figure 8:
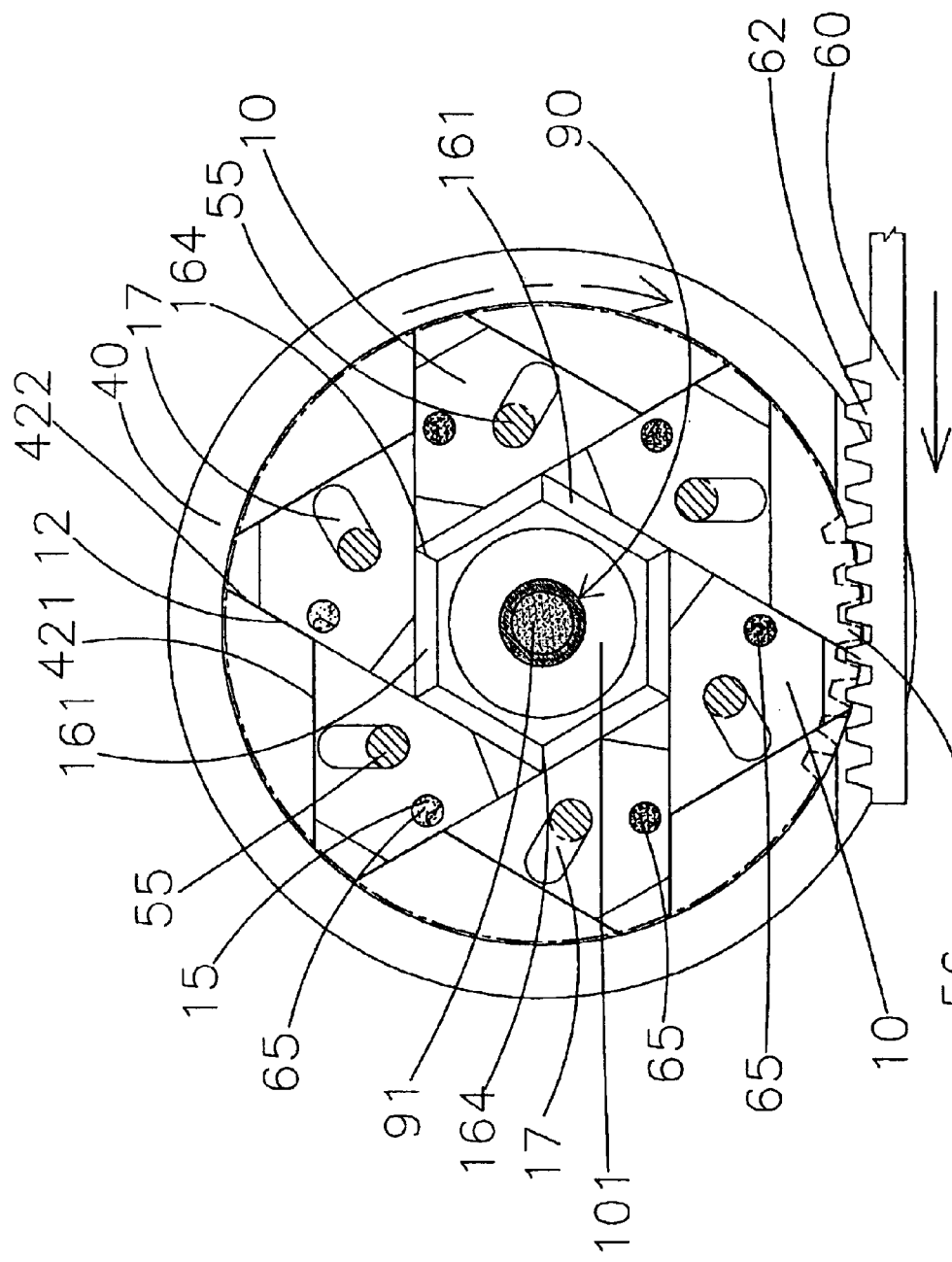
FIG. 8 shows a top view of the plurality of cutting tool elements opened showing the central opening according to the present invention.
Figure 9:
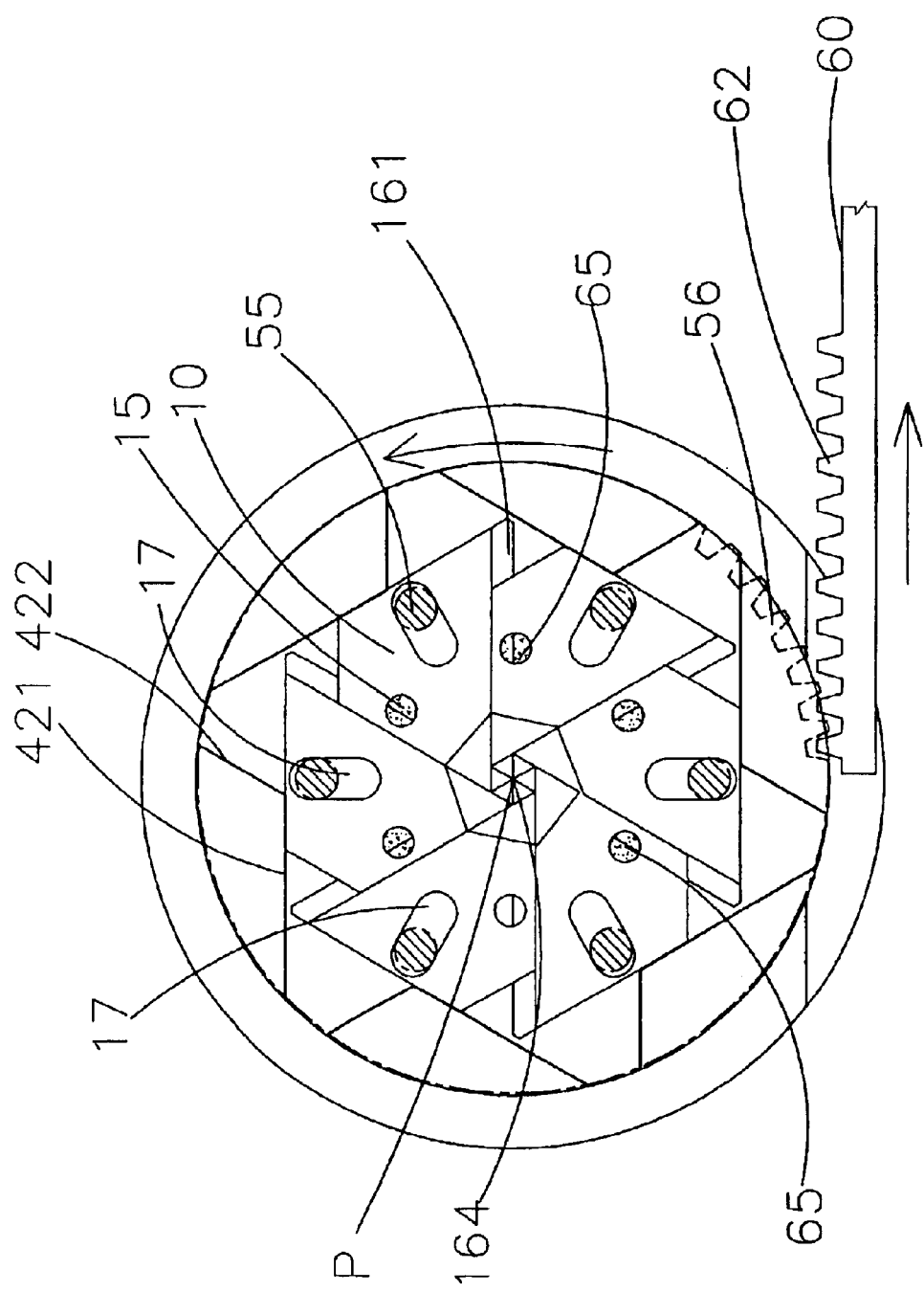
FIG. 9 shows a top view of the plurality of cutting tool elements converged showing the closed central opening according to the present invention.

2. Motion of Mutual Interfacial Convergence of the Blades 164 of Each Pair of the Adjacent Cutting Tool Elements 10:

Referring to FIGS. 5 and 6, the plurality of cutting tool elements 10 of the present invention are assembled from an even number of cutting tool elements 10 (not an odd number), and mounted within the recess 42 of the circular disc 40. Each of the cutting tool elements 10 equally contribute actively and actualize respective displacement and convergence towards the central line P of the central opening 101 of the plurality of blades 164, thereby closing the central opening 101 (see FIG. 9). The plurality of cutting tool elements 10 open to form the central opening 101, and a nozzle 200 continually outputs the cylindrical food product 90. As FIG. 8 depicts, interior of the cylindrical food product 90 is provided with a filling 91 and cooked egg yolks 92. Each of the cooked egg yolks 92 is evenly distributed at equal distances within the filling 91. As depicted in FIGS. 7 and 9, upon interfacial convergence of the plurality of blades 164, corresponding convex blades 1641 close in and come in mutual contact, and the vertical blades 1642 close-in and come in mutual contact, thereby severing the cylindrical food product 90 and forming a spheroidal food product 95 therefrom. As depicted in FIG. 10, during the course of the cutting tool elements 10 closing the central opening 101, the convex rails 161 and the slide grooves 162 in a continuity of contacts knead the outer circumferential surface of the cylindrical food product 90, thereby forming depressions 93 and protrusions 94, enabling transversal deepening of the depressions 93 and protrusions 94 while continually advancing along the central region of the cylindrical food product 90. Such motion achieves locating positions on the cylindrical food product 90 similar to that motion performed by fingers grasping the cylindrical the food product 90, and thus prior to the blades 90 severing the cylindrical food product 90 realizes functionality of grasping the severing position, thereby achieving invariable and effective severing of the cylindrical food product 90.

Figure 11:
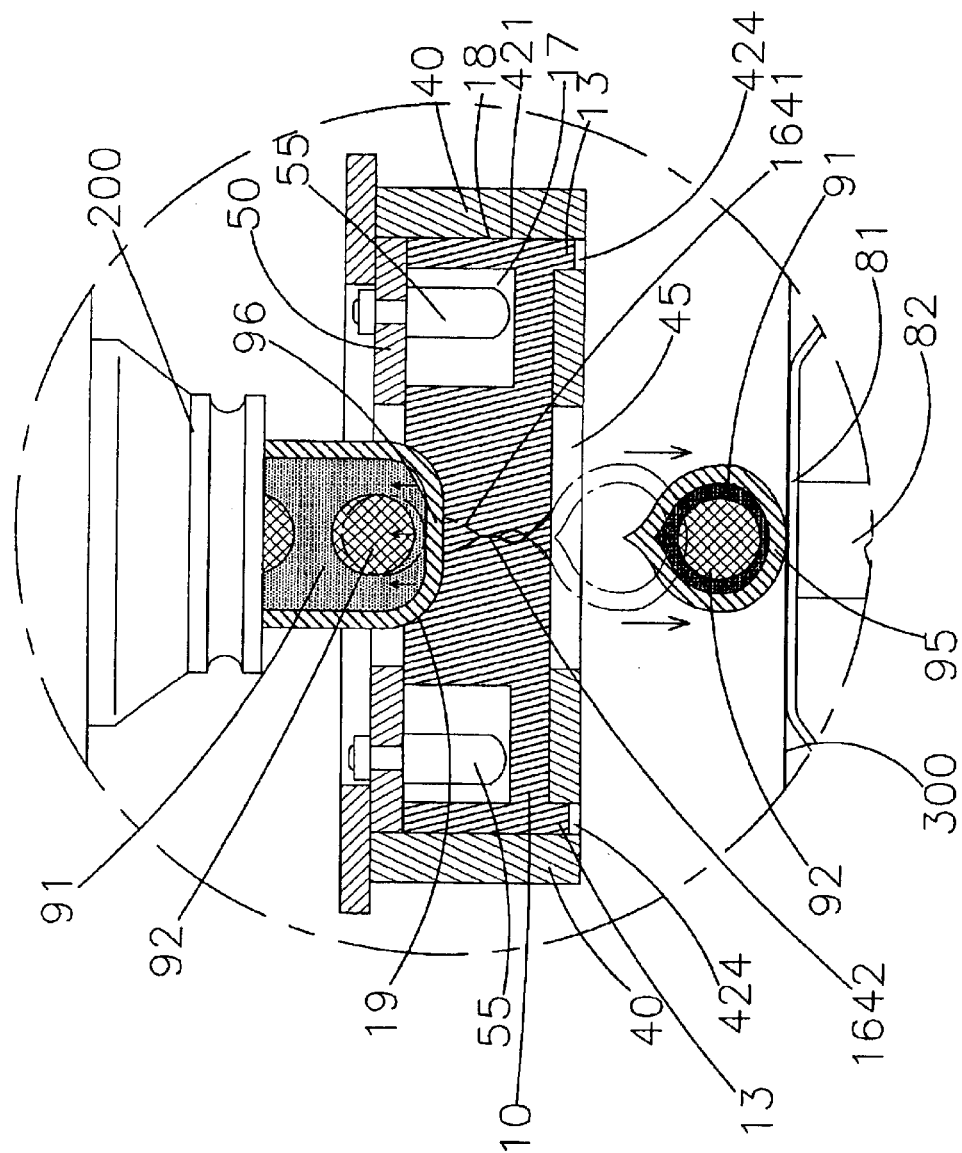
FIG. 11 shows a cross sectional view of the cutting tool set depicting the severed cylindrical food product forming a spheroidal food product according to the present invention.

Referring to FIG. 11, the arc-shaped notch 19 configured on a side edge of each surface of the cutting tool elements 10 provides for supporting of a tail 96 of the cylindrical food product 90 after being severed, thereby enabling the tail 96 to centralize within the arc-shaped notch 19. The cooked egg yolks 92 situated within the cylindrical food product 10, because of compressive force produced from convergence of the blades 164, enables slight displacement upwards of the local filling 91 and the cooked egg yolks 92, and the cooked egg yolks are thereby controlled to be centrally positioned within the severed and molded spheroidal food product.

The conveyor belt 300 is configured below the cutting tool elements 10, and the top plate 81 is configured below the conveyor belt 30, and so adapted to enable ascending and descending thereof. Ascending of the top plate 81 props up high the conveyor belt 300, and thereat receives the just molded spheroid food product 95. Upon the top plate 81 descending, the conveyor belt 300 also descends therewith and position of same is thus displaced downwards carrying the spheroid food product 95, which is then conveyed away by the conveyor belt 300.

3. Lubrication of the Cutting Tool Elements 10 While Sliding:

Referring to FIG. 8, the semisolid edible oil 65 is stored within the grooves 15, and when the cutting tool elements 10 are sliding, the edible oil 65 slowly seeps out from the oil guide grooves 15. Thus, when the cutting tool elements 10 are running, the edible oil 65 can thereby lubricate the inner side sliding surfaces 12 and the outer side sliding surfaces 16 of the cutting tool elements 10, thereby enabling smooth sliding of the cutting tool elements 10, and thus preventing rise of frictional surface heat. Furthermore, when the cutting tool elements 10 sever the cylindrical food product 90, dough material will not adhere to the cutting tool elements 10.

4. Individual Actuation of the Cutting Tool Elements 10:

Referring to FIG. 6, the recess 42 is configured center of the disc 40, and the cutting tool elements 10 respectively make sliding contact within the recess 42. The row of teeth 60 are so configured to run back and forth in a straight line, thereby driving the plate 50 to correspondingly centrally rotate to-and-fro in a clockwise and anticlockwise direction about a centerline 521 of the circular perforation 52. The guide pins 55 translatory slide within the grooves 17, thereby applying force to walls of the grooves 17, and driving each of the cutting tool elements 10, thus actively actuating intermittent forward and reverse displacement thereof, and hence controlling closing or opening of the central opening 101 by the cutting tool elements 10. When the central opening 101 is open, during the course of position sliding of the cutting tool elements 10, the A sliding surfaces. 18 and the B sliding surfaces 421 slide against each other, thereby controlling and enhancing steadiness of the cutting tool elements 10 (see FIG. 10).

When the central opening 101 has been opened to an outer dead center, a portion of the sliding surfaces 12 slide and berth on the B top wall surfaces 422, thereby realizing functionality to control position of each of the cutting tool elements 10 to open to the outer dead center.

Figure 12:
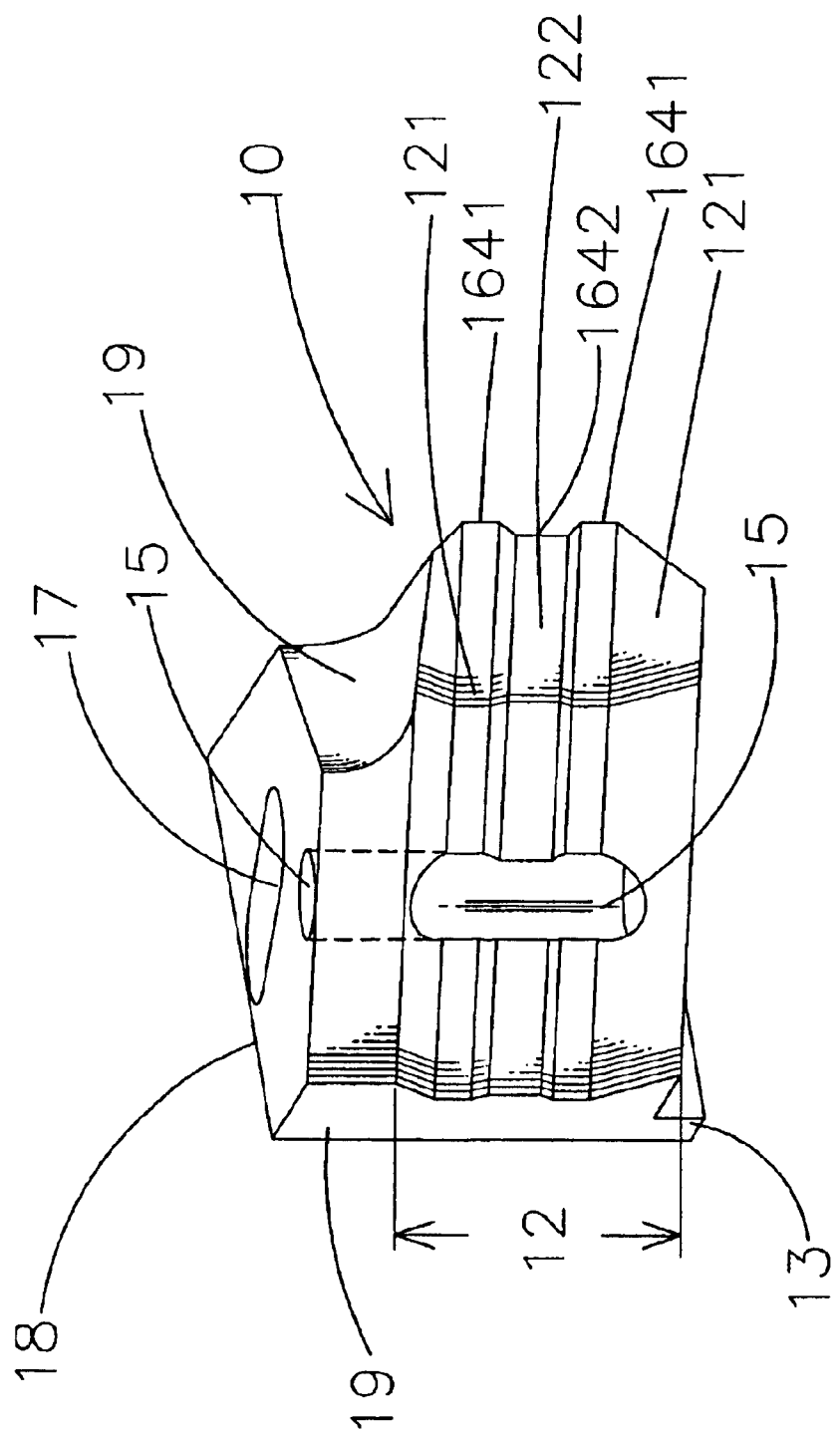
FIG. 12 shows an elevational view of an embodiment of another cutting tool element according to the present invention.
Figure 13:
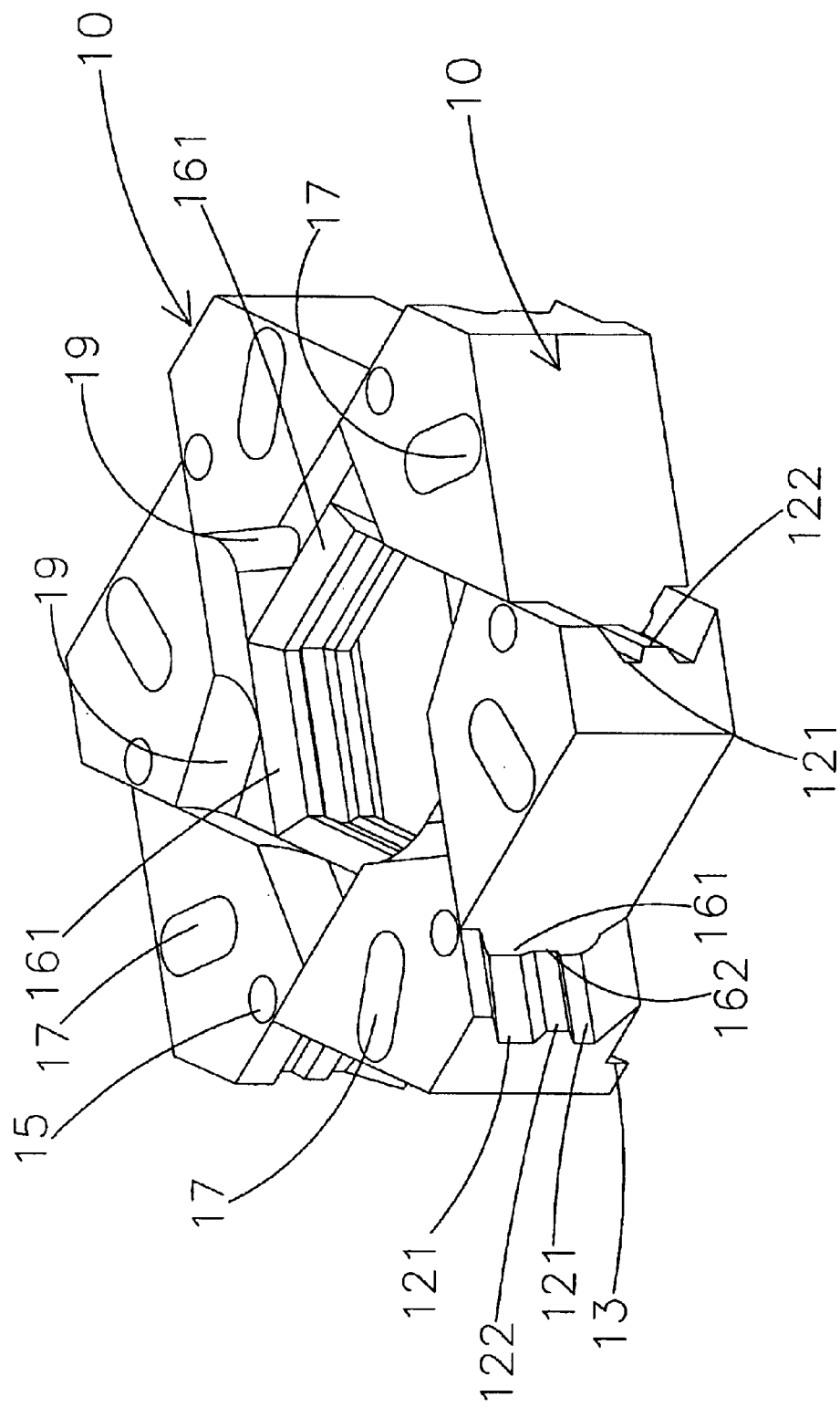
FIG. 13 shows an elevational view of an assemblage of the plurality of cutting tool elements of FIG. 12 making sliding contact according to the present invention.

5. Referring to FIGS. 12 and 13, which show another embodiment of the present invention.

The slide grooves 121 and the convex rails 122 of the cutting tool elements 10 of the embodiment are configured to be of a multiangular trapezoid form, and the convex rails 161 configured on the outer side sliding surfaces 16 and the slide grooves 162 are also configured to be of trapezoid form. The blades 164 thus form a multiangular trapezoidal line, and similarly the trapezoidal convex rails 122 of each of the adjacent cutting tool elements 10 slide within the slide grooves 162. The slide grooves 121 slide on the convex rails 161. The embodiment as disclosed is included in the claims of the patent application of the present invention as disclosed hereinafter.

Figure 14:
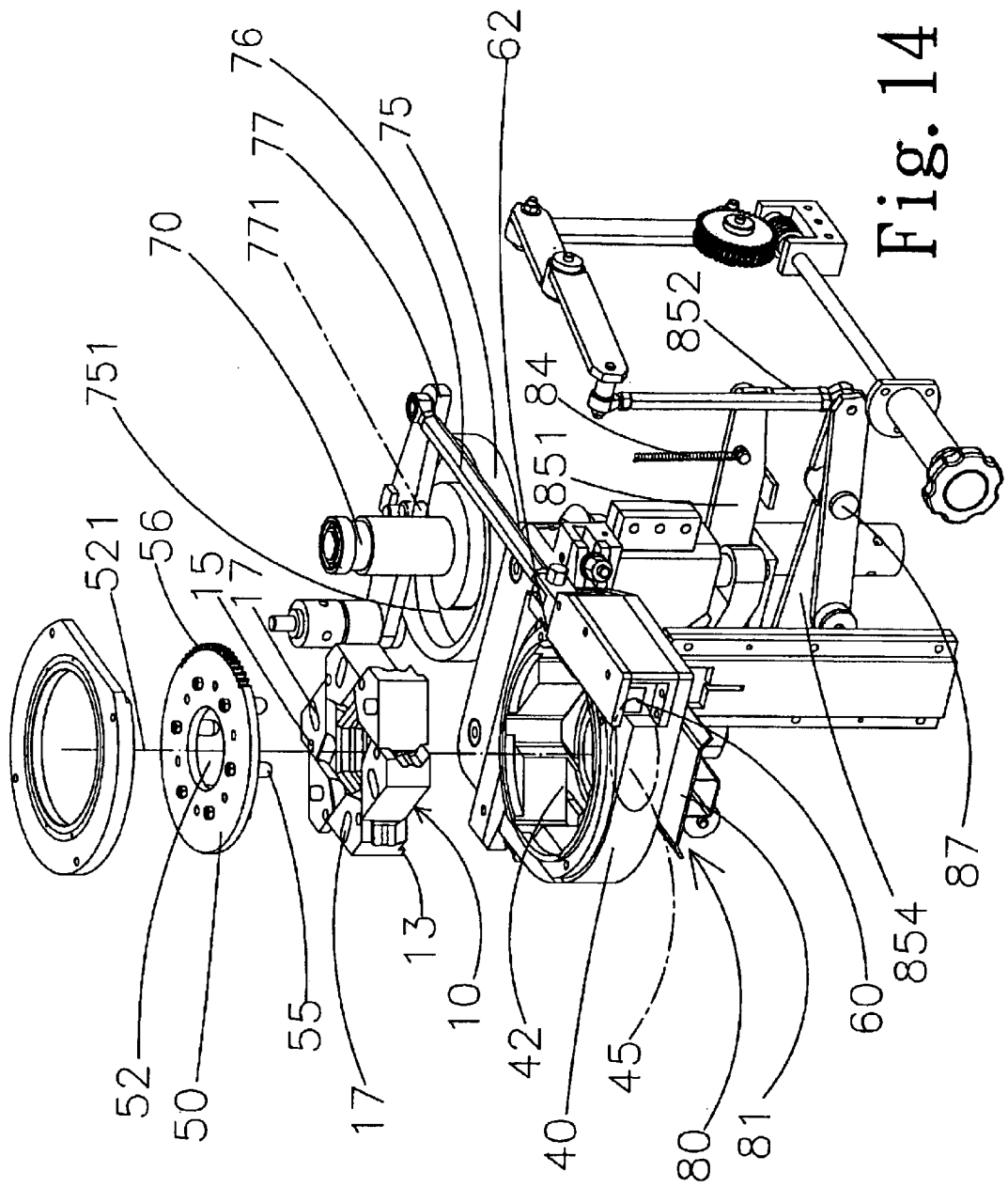
FIG. 14 shows an elevational view of a top assembly and an assemblage of the plurality of cutting tool elements according to the present invention.
Figure 15:
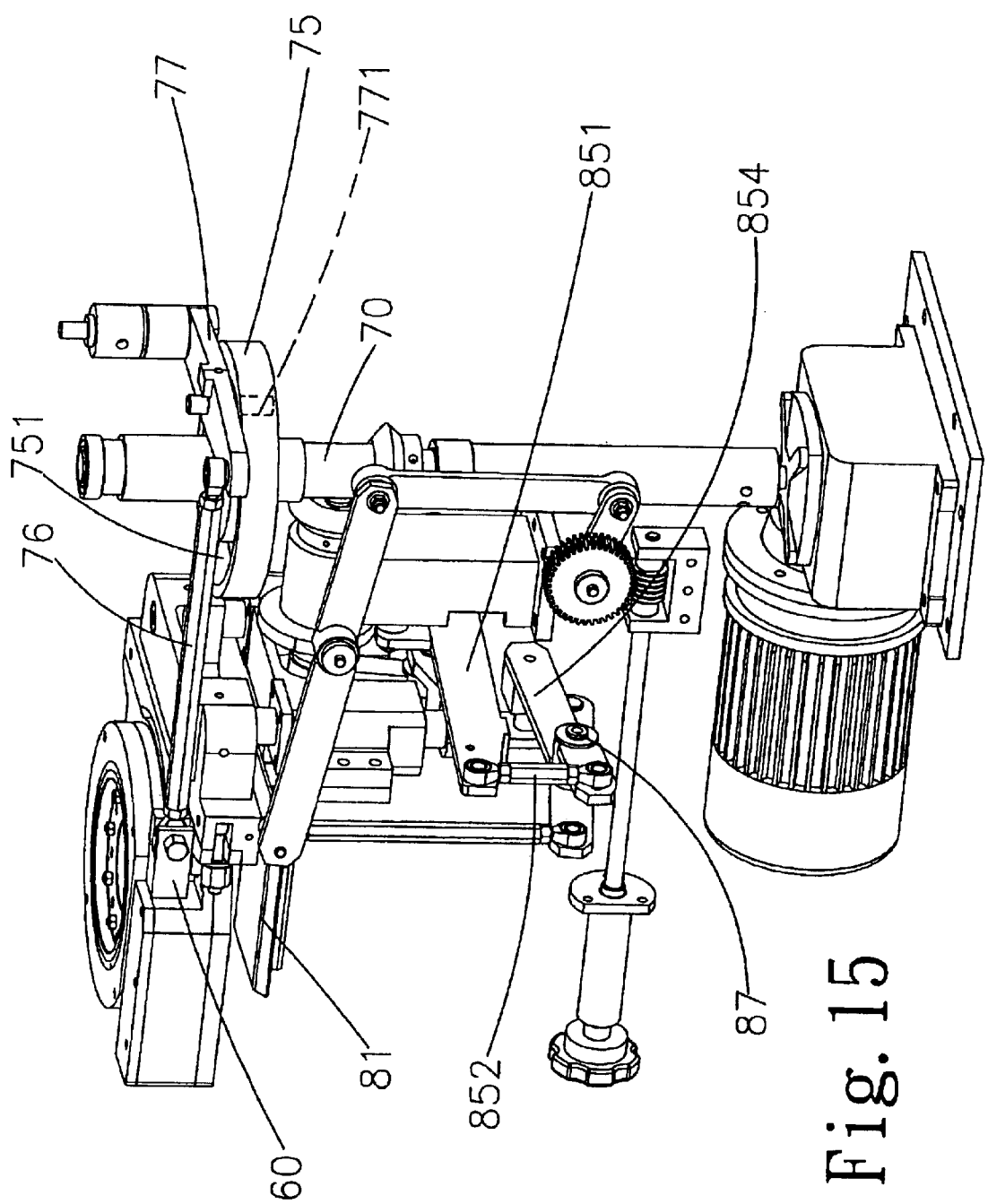
FIG. 15 shows another elevational view of a top assembly and an assemblage of the plurality of cutting tool elements according to the present invention.
Figure 16:
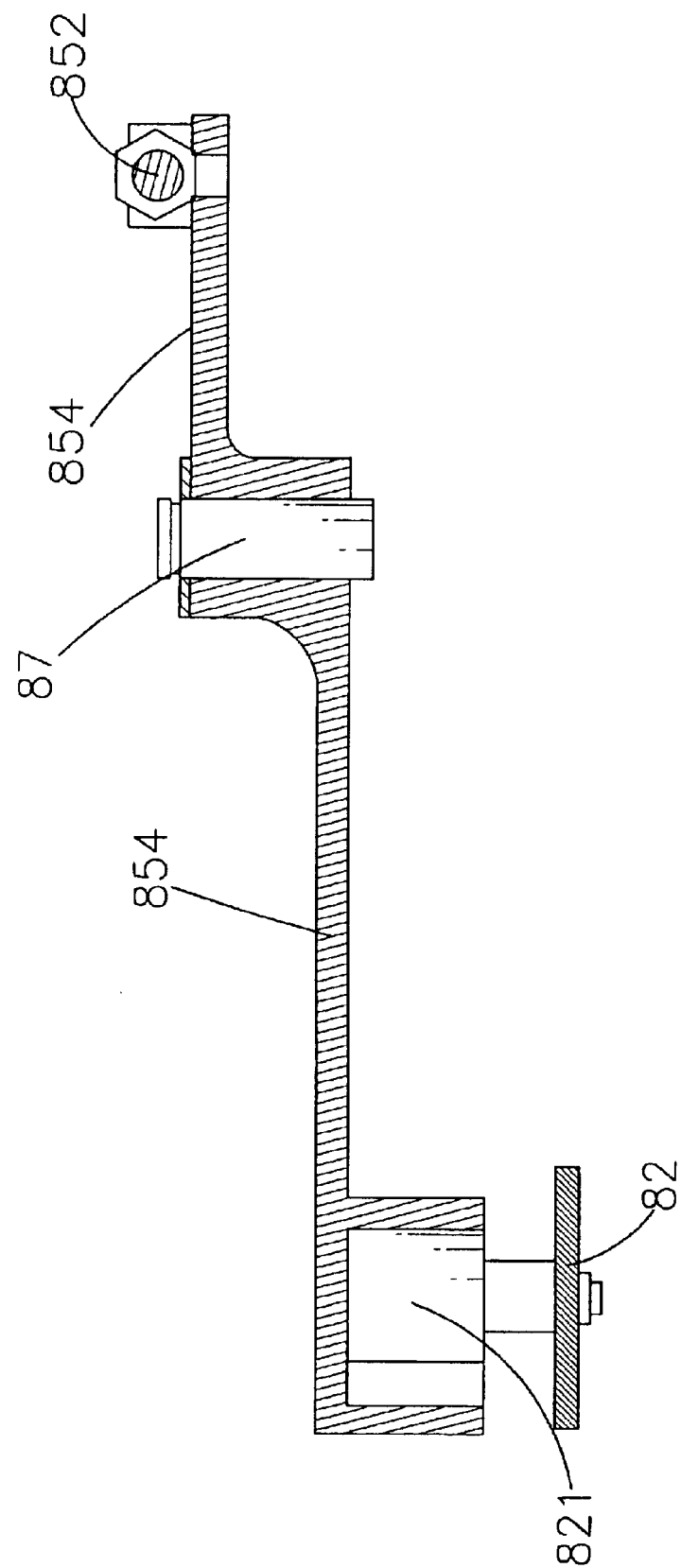
FIG. 16 shows a cross sectional schematic view of connecting rods of the top assembly according to the present invention.
Figure 18:
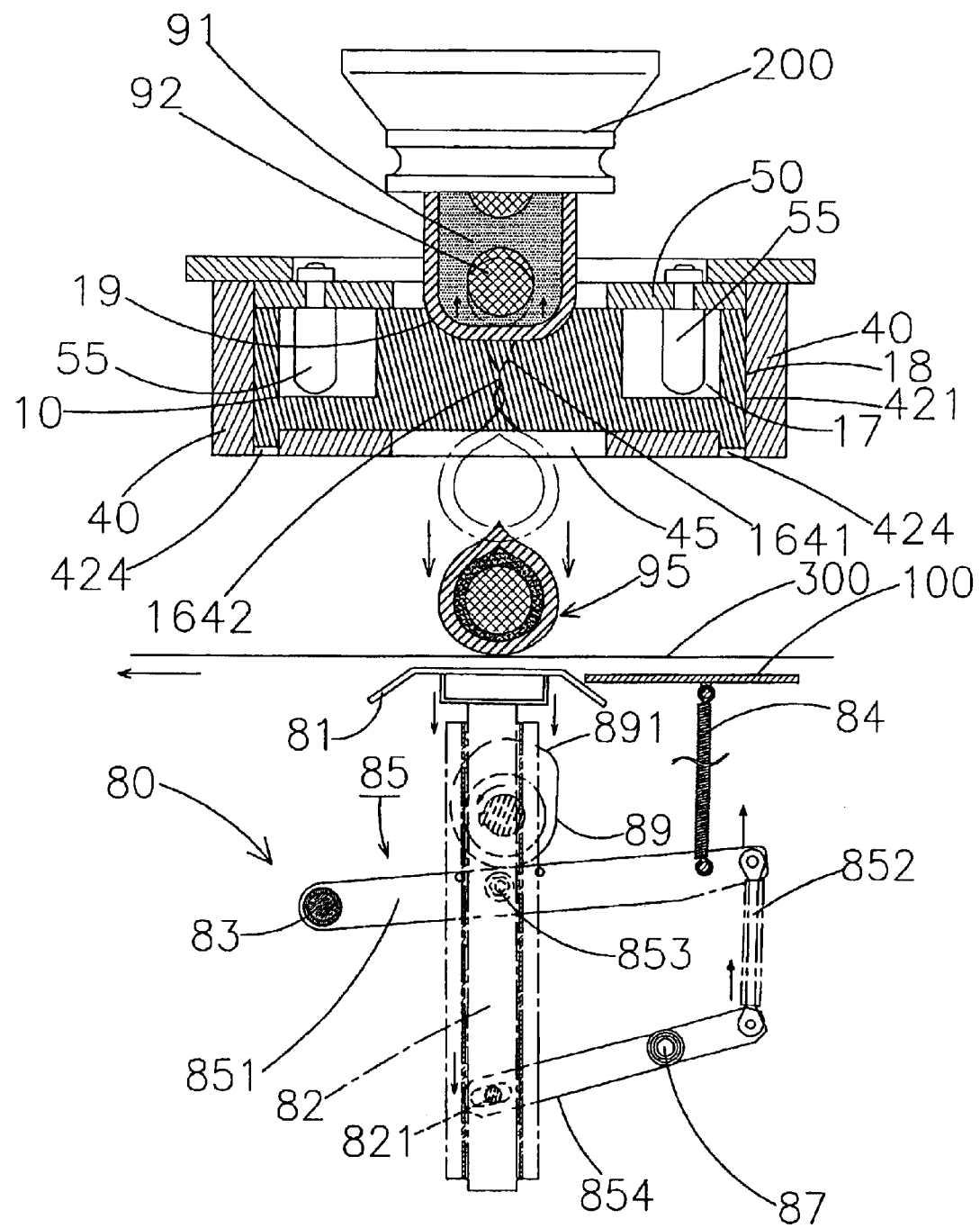
FIG. 18 shows a cross sectional schematic view of the top plate positioned at a bottom dead center according to the present invention.

6. Motion of the Spheroidal Food Product 95 Being Received and Conveyed Away:

Referring to FIGS. 14 and 15, which show the top plate 81 positioned below the central perforation 45. As depicted in FIG. 18, prior to the protruding end 891 of the actively rotating cam 89 coming in contact with the small pulley 853, the upper connecting rod is immobile, and thus the top plate 81 does not ascend (is motionless). The conveyor belt positioned atop the plate 81 transversely moves forward in a predetermined direction, thereby conveying away the spheroidal food product 95.

Figure 17:
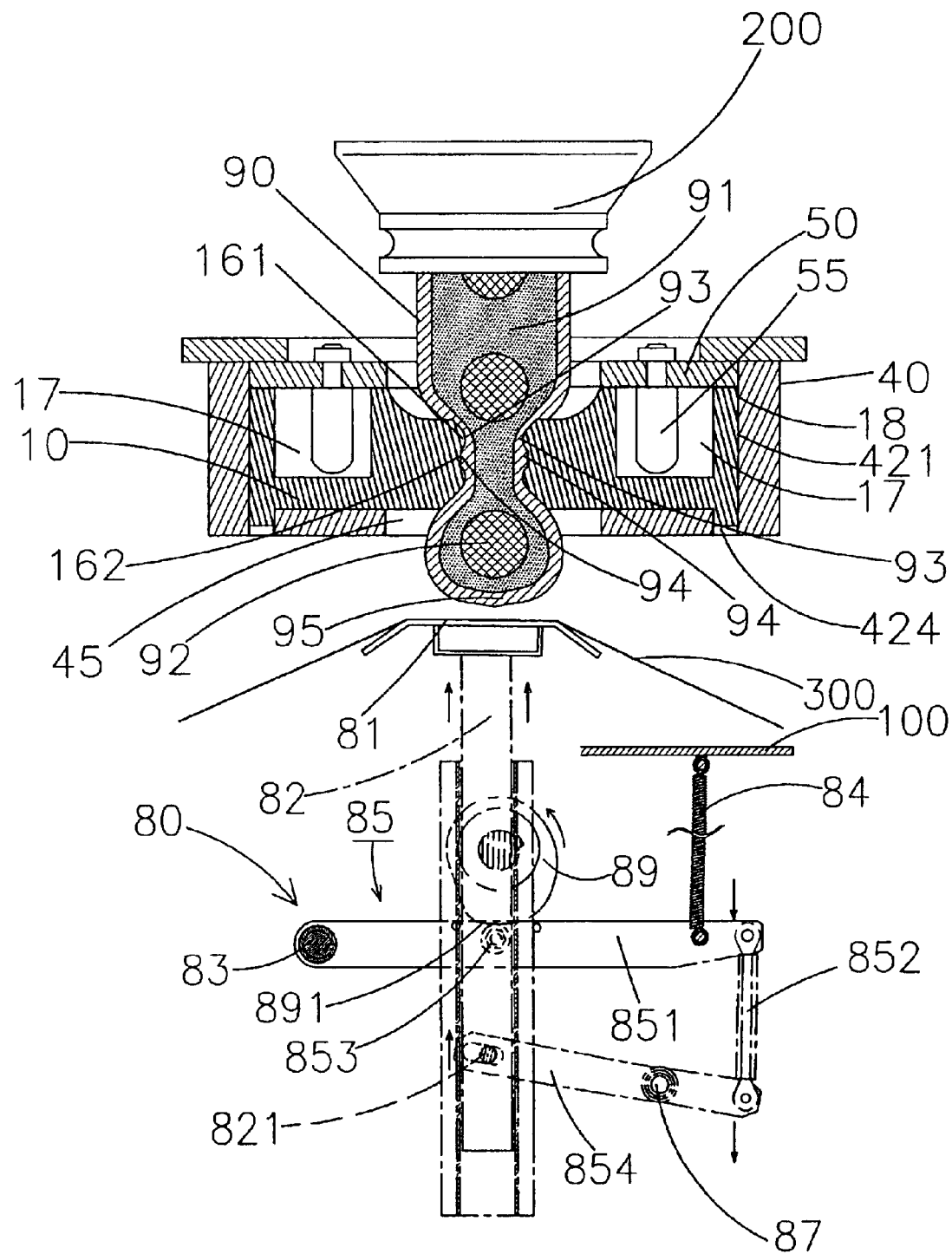
FIG. 17 shows a cross sectional schematic view of a top plate positioned at a top dead center according to the present invention.

Referring to FIG. 17, when the protruding end 891 revolves and comes in contact with and roll presses the small pulley 853, thereupon the upper connecting rod 851 is actuated to move about the fixed shaft 83 as a turning axle, and thus realizes a downward rocking motion. An upper extremity of the spring 84 is securely fastened to the member 100, and thereat forms a fixed terminal. At this time the spring 84 is in a state of tension, and the vertical connecting rod 852 is downwardly displaced, which thereby actuates the lower connecting rod 854 to perform a downward rocking motion with an axis 87 acting as axle center, and thus actuates the sliding plate 82, displacing same in an upward direction. The top plate 81 synchronously displaces upward to the top dead center, and the conveyor belt 300 (at this time in a stationary state) is also pushed upward to the top dead center by the top plate 81. At an appropriate time, the conveyor belt 300 meets up with the tail section of the severed spheroidal food product 95, whereupon the protruding end 891 departs from the small pulley 853, both the spring 84 and the upper connecting rod 851 reposition, and thus the top plate 81 descends to the lower bottom dead center, whereat the conveyor belt 300 conveys away the spheroidal food product 95 (see FIG. 18).

7. Actuation of the Annular Plate 50:

Referring to FIGS. 14 and 15, rotation of a main transmission shaft 70 synchronously actuates a turnplate 75. An arc-shaped slide groove 751 is defined in a center of the turnplate 75, and a straight small pulley 771 connects to a lower side of a second connecting rod 77. The small pulley 771 produces a corresponding pressure directed towards the walls of the arc-shaped slide groove 751, which thus slides and displaces position, thereby controlling intermittent rocking motion of the second connecting rod 77, and thus actuates the first connecting rod 76 and rectilinear to-and-fro rocking motion thereof, enabling the first connecting rod 76 to push the row of teeth 60 and thus produce rectilinear to-and-fro motion thereof. At this time, the teeth 62 on the row of teeth 60 actuate a meshing motion with the teeth 56 of the plate 56, therefore the plate 50 is made to produce a back and forth motion that rotates clockwise and anticlockwise in a horizontal plane.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A device for molding spheroidal food products comprising:

a plurality of cutting tool elements;

a central opening formed between frontal sections of blades defined on front-ends of the plurality of cutting tool elements;

a cylindrical food product continuously passing downwardly through the central opening;

the blades of the plurality of cutting tool elements slide relative to adjacent cutting tool elements of the plurality of cut tool elements to open and close the central opening; and an inner side sliding surface and an outer side sliding surface configured on each of the cutting tool elements;

wherein a transverse slide groove and a convex rail are respectively configured on the innerside sliding surface, and another transverse slide groove and another convex rail are respectively configured on the outer side sliding surface, and the convex rails of each of the adjacent cutting tool elements respectively slide along the slide grooves; an edge formed from angle of intersection of the inner side sliding surface and the outer side sliding surface defines the blade;

such that, when the plurality of cutting tool elements moves the central opening from an open position toward a closed position the plurality of convex rails exert pressure and hold firm a circumferential surface of the cylindrical food product, thereby enabling the surface of the cylindrical food product to gradually form a plurality of deep depressions and protrusions along a central region of the cylindrical food product; thus upon closing of the central opening, the cylindrical food product is thereupon severed by the converged plurality of blades, and molded into a spheroidal food product therefrom.

2. A device for molding spheroidal food products according to claim 1, wherein each of the cutting tool elements has:

the inner side sliding surface, whereon the plurality of transverse grooves is defined, and the convex rail is formed between each pair of the adjacent grooves;

the outer side sliding surface, whereon is configured a plurality of transverse convex rails;

the groove is defined from an indentation formed between each pair of the adjacent convex rails;

the blade, whereby the edge formed from the angle of intersection of the inner side sliding surface and the outer side sliding surface defines the blade; and a plurality of arc-shaped rails which operate in coordination with and slide within the slide grooves of the adjacent cutting tools elements, and the slide grooves which operate in coordination with and slide on the convex rails of the adjacent cutting tool elements.

3. A device for molding spheroidal food products according to claim 1, wherein an upper vertical convex surface is configured on an upper edge of a surface of the inner side sliding surface;

wherein an upper vertical concave surface is configured on the outer side sliding surface, whereby the vertical concave surface can slide on the convex surface; and, a rear side wall surface of the cutting tool element forms a first sliding surface, and a second sliding surface and a top wall surface are respectively configured on an inner circumferential edge wall of a recess interior to a disc, the first sliding surface slides on the second sliding surface, the inner side sliding surface slides on the top wall surface, a central perforation is defined in the recess, which provides for a mutual passage with the central opening.

4. A device for molding spheroidal food products according to claim 1, wherein the plurality of cutting tool elements are pin connected to an annular plate, a circular perforation is defined in the annular plate, and a plurality of guide pins are respectively firmly secured on an underneath face of the annular plate, each of the guide pins freely connect and respectively slide within a groove defined atop each of the cutting tool elements; a system of teeth are configured on an outer edge of the annular plate, whereby the system of teeth mesh with another system of teeth of a row of teeth, and the row of teeth are so configured to run back and forth, thereby driving the plate to correspondingly rotate to-and-fro in a clockwise and anticlockwise direction, the guide pins drive the plurality of cutting tool elements to mutually slide displace, and as a consequence open and close the central opening thereof.

5. A device for molding spheroidal food products according to claim 1, wherein vertical grooves are defined in the inner side sliding surfaces, and provide for semisolid edible oil to be infixed for additory usage therewith.

6. A device for molding spheroidal food products according to claim 1, wherein a continuity assembly of at least one convex blade and at least one vertical blade is configured on the blade of each of the cutting tool elements, the convex blades of each pair of the corresponding cutting tool elements can mutually contact and converge, and the vertical blades of each pair of the corresponding cutting tool elements can also mutually contact and converge, thereby enabling closing of the central opening.

7. A device for molding spheroidal food products according to claim 1, wherein a top connecting device is configured below a central perforation, and comprises:

a top plate positioned below the central perforation, a lower end of the top plate is connected to a slide plate, and a lower end of the slide plate is provided with a connecting terminal;

a rocker set driven by a cam, comprising:

an upper connecting rod, one end of which is loose connected to a fixed shaft, with the fixed shaft serving as axle center of gyration, and another end is loose connected to one end of a vertical connecting rod, and wherein a small pulley is configured at an appropriate position on a side rod of the upper connecting rod;

a spring is attached to a stationary member, thereby forming a fixed terminal;

another end is connected to the upper connecting rod, thus providing the upper connecting rod with a springiness effect;

a lower connecting rod, one end of which is loose connected to a lower end of the vertical connecting rod, and another end is loose connected to the connecting terminal of the slide panel;

the small pulley, driven by intermittent contact of protruding ends of the cam, thereby impels the slide plate to translate position in an upward or downward direction;

a conveyor belt positioned atop the plate, whereby upward translation of the top plate displaces upward and supports the conveyor belt at a higher position, and downward translation of the top plate to a bottom dead center thereat releases the conveyor belt.

* * * * *